June 10, 1952     E. W. JOHNSON ET AL     2,599,557
PROCESS FOR MAKING ORGANO-TIN HALIDES
Filed March 24, 1948
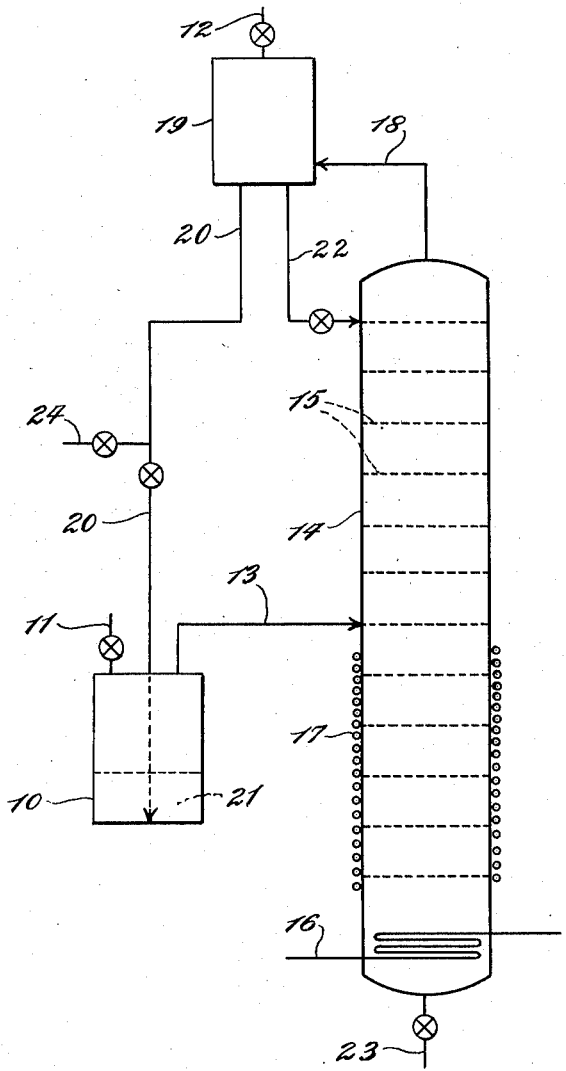
INVENTORS
Ernest W. Johnson
and James M. Church
BY
Burgess, Ryan and Hicks
ATTORNEYS Patented June 10, 1952

2,599,557

UNITED STATES PATENT OFFICE 2,599,557

PROCESS FOR MAKING ORGANOTIN HALIDES

Ernest W. Johnson, Mountainside, and James M. Church, Tenafly, N. J., assignors to Metal & Thermit Corporation, New York, N. Y., a corporation of New Jersey Application March 24, 1948, Serial No. 16,698

6 Claims. (Cl. 260—429)

This invention relates to processes for making organo-tin compounds in which the organo portion of the compounds comprises an aryl, alkyl, or aralkyl hydrocarbon radical. More particularly, it relates to processes for making organo-tin compounds and continuously separating a desired compound as it is formed.

An object of the invention is to provide a process in which a mixture of organo-tin mono- and trihalides is subjected to treatment according to which the mono- and trihalides may be converted to form the dihalide and the latter continuously and coincidently separated. If desired, the various halides may be separately recovered. The mixture, which originally may or may not contain the dihalide, may be obtained from any source, but preferably is formed as hereinafter described.

Another object of the invention is to provide a process for preparing mixed tin alkyls, mixed tin aryls, tin alkyl-aryls, mixed tin aralkyls, tin alkyl-aralkyls, and/or tin aryl-aralkyls, and for continuously separating a desired product coincidently with its formation. Other objects and advantages will be apparent hereinafter.

Generally speaking, the invention in one form comprises a process for making tin hydrocarbon compounds of the type $R_2SnX_2$, in which R is at least one radical selected from the group consisting of aryl, alkyl, and aralkyl hydrocarbon radicals, Sn is tin, and X is halogen, which comprises: heating a mixture comprising $RSnX_3$ and $R_3SnX$ to produce $R_2SnX_2$, placing the reaction mixture under subatmospheric pressure, continuing the heating to distill the dihalide and any more volatile material, collecting the distillate, separating more volatile material from the dihalide and returning the more volatile material to the reaction mixture. The dihalide may be separated from the more volatile derivative by distillation and the latter returned to the reaction mixture. The mono- and trihalides are converted to form additional amounts of dihalide by heating the two together, and in this step the dihalide coincidently distills out of the reaction mixture as it is formed.

The invention in the form above described further comprises the process of forming a mixture of the mono-, di-, and trihalides by heating $R_4Sn$ with $SnX_4$, in which R and X are the same as before, to produce a mixture of $R_2SnX_2$, $RSnX_3$ and $R_3SnX$, placing the mixture under subatmospheric pressure, and proceeding as above described.

In another or second form, the invention comprises a process for making non-halogen containing tin hydrocarbon compounds of the type: $R_2R'_2Sn$, in which R and R' are alkyl, aryl or aralkyl radicals and in which R and R' are different, which comprises: heating a mixture comprising $RR'_3Sn$ and $R_3R'Sn$ to form $R_2R'_2Sn$, reducing the pressure on the mixture, continuing the heating to distill $R_2R'_2Sn$ and more volatile material from the mixture, collecting and heating the $R_2R'_2Sn$ and more volatile material to separate the latter from the $R_2R'_2Sn$, and returning the more volatile material to the mixture. In this process the said mixture comprising $RR'_3Sn$ and $R_3R'Sn$ may be prepared by heating $R_4Sn$ and $R'_4Sn$, in which R and R' have the value described in the present paragraph.

Referring in detail to the first form of the invention, the organo-tin starting material, $R_4Sn$, for preparing the organo-tin halides may include tin aryls such as tetraphenyl tin, tetratolyl tin, tetraxylyl tin, etc.; tin alkyls such as tetrabutyl tin, tetrapropyl tin, tetraisobutyl tin, tetraamyl tin, tetralauryl tin, and the like; tin aralkyls such as tetrabenzyl tin; mixed tin alkyls such as dibutyl diamyl tin, butyl trilauryl tin, etc.; and tin alkyl-aryls such as butyl triphenyl tin, dibutyl diphenyl tin, etc. The tin tetrahalide, $SnX_4$, may be tin tetrachloride, tin tetrabromide, etc.

The organo-tin compound and the tin tetrahalide are mixed in a molar ratio of about 1 to 1, preferably in a reactor, to produce a liquid mass, the mixture being warmed, if necessary, to liquefy the reactants. The mixture is heated in the range of about 175 to about 225° C., at which temperature the reaction proceeds, and then it is immediately placed under a suitable subatmospheric pressure sufficient to permit the organo-tin dihalide to distill out along with more volatile material such as the trihalide. The monohalide is left in the reaction mixture.

The di- and trihalides may be collected and fractionated under reduced pressure, the trihalide being lower boiling and distilling out, leaving the dihalide as bottoms. The trihalide is returned to the reactor and heated with the monohalide, the two compounds undergoing conversion, or redistribution, to the dihalide. As additional dihalide is formed, it distills out, along with trihalide, and is continuously collected and fractionated as described. The redistribution reaction takes place at the distilling temperature of the di- and trihalides, the distillation being carried out at reduced pressure.

The foregoing process for making the halide compounds may be, and preferably is, run continuously, as described, although it may also be carried out in stages. If a stagewise method is used, the initial reactants, i. e., R₄Sn and SnX₄, are not placed under vacuum until they have substantially completely reacted to form the mixed organo-tin halides. Then while the reaction mixture is still hot, a vacuum may be applied and the process completed as described.

The invention may be illustrated in connection with the preparation of an aryl tin halide, namely, diphenyl tin dichloride, suitable apparatus for carrying out the process being diagrammatically shown in the drawing. One mol each of tetraphenyl tin and stannic chloride are mixed and the liquid mass charged to reactor 10 via line 11. The reactor is provided with suitable heating means for heating the reactants to initiate the reaction. The mixture is then placed under vacuum by connecting line 12 to a suitable source of low pressure. Heating of reactor 10 is continued to maintain the mixture at the above temperature. The amount of vacuum to be applied is variable, a suitable value being about 10 mm., at which pressure the distilling temperature for the mixture in reactor 10 will be in the range of 190–200° C. As the reaction proceeds, phenyl tin trichloride, diphenyl tin dichloride, and triphenyl tin chloride are formed. Phenyl tin trichloride and diphenyl tin dichloride distill out of the reactor as they are formed and are removed through line 13 and delivered to a fractionator 14, wherein they are separated. The triphenyl tin chloride remains in the reactor 10. Fractionator 14 may be provided with conventional trays or bubble plates 15 and also with suitable pot heating means diagrammatically represented at 16, which may be electrical or which may comprise a heat exchange medium. Suitable reboiling means are also provided, such as the electrically heated resistance winding 17. The phenyl tin trichloride, which boils at about 140° C. at 10 mm., is taken overhead in the column 14 and delivered through line 18 to a condenser 19, where it is condensed and then passed through line 20 to reactor 10. As shown, line 20 extends below the surface of the liquid 21 in reactor 10. A portion of the trichloride may be returned to the column through line 22 to serve as reflux.

The phenyl tin trichloride and the triphenyl tin chloride, when heated together, form or redistribute to diphenyl tin dichloride. The latter must not be allowed to accumulate or else the redistribution reaction will stop. Accordingly, by removing the dichloride as it is formed, and by returning the trichloride, the redistribution reaction proceeds until all of the mono- and trichloride are converted to the dichloride, which accumulates in fractionator 14 and may be removed therefrom through line 23. The invention thus involves the coincident formation and separation of the desired dichloride product. Yields of substantially pure dichloride of over 90% may be obtained.

If the foregoing process is performed stagewise, the tetraphenyl tin and stannic chloride reactants are heated at about 200° C. at atmospheric or subatmospheric pressure until their conversion to the mixed phenyl tin chlorides is complete. One or two hours may be required for this stage of the process. Then the reaction mixture, while still hot, is placed under a vacuum of about 10 mm. to initiate the second stage. Heating of the mixture is continued to maintain it at about 200° C., and the remainder of the process is performed as described above.

Instead of starting with R₄Sn and SnX₄ to produce the dihalide, a mixture of $RSnX_3$, $R_2SnX_2$, and $R_3SnX$ may be used, as will be apparent. Also, as indicated above, $RSnX_3$ and $R_3SnX$ may be heated together to form $R_2SnX_2$, which may be distilled out as formed in the manner described.

If desired, the mixed organo-tin halides formed from the R₄Sn and SnX₄ starting materials may be separated and collected. In this case the di- and trihalides are distilled from the monohalide, then fractionated as before, but instead of returning the trihalide to the monohalide it is collected, for example by removing it through line 24.

As an example of preparing an alkyl tin halide, the preparation of dibutyl tin dichloride may be mentioned. In this case tetrabutyl tin is heated with stannic chloride at a temperature of about 135 to about 140° C. to produce a mixture comprising butyl tin trichloride, dibutyl tin dichloride, and tributyl tin chloride. The procedure for carrying out the heating step is the same as in the case of the phenyl tin chlorides. The reaction is carried out under vacuum, say about 10 mm. pressure, and at the temperature described, under which conditions dibutyl tin dichloride, which boils at about 135° C. at 10 mm., distills out of the reaction mixture as it is formed, along with the butyl tin trichloride, boiling point about 93° C. at 10 mm. The di- and trichlorides are then fractionated in column 14, the trichloride passing overhead and being returned to the reaction mixture in reactor 10 while the dichloride is removed from the column as product. Continued heating of the mono- and trichlorides in reactor 10 results in their conversion to the dihalide, which distills out as described, and this process continues until all of the mono- and trichlorides are converted.

Other organo-tin dihalides which may be prepared according to the invention are mixed alkyl tin dihalides such as butyl amyl tin dichloride, etc., alkyl-aryl tin dihalides such as butyl phenyl tin dichloride, etc. As will be understood, the mono- and trihalides of such compounds may be recovered as well as the dihalides.

In the second form of the invention, non-halogen containing compounds such as mixed tin alkyls, mixed tin aryls, tin alkyl-aryls, mixed tin aralkyls, tin alkyl-aralkyls, and tin aryl-aralkyls may be prepared and a desired compound separated as it is formed. These compounds may be prepared from R₄Sn and R′₄Sn, in which R and R′ are alkyl, aryl or aralkyl groups and in which R and R′ are different. In the case of the mixed tin alkyls, for example, tin tetrabutyl may be reacted with tin tetraamyl to form a mixture of dibutyl diamyl tin, butyl triamyl tin, and tributyl amyl tin. This mixture may then be separated as it is formed on the basis of boiling point differences of the individual compounds. This form of the invention may be illustrated by the preparation of a tin alkyl-aryl such as dibutyl diphenyl tin. Tetrabutyl tin and tetraphenyl tin are converted to a mixture of butyl triphenyl tin, dibutyl diphenyl tin, and tributyl phenyl tin by heating at about 190° C., preferably in the presence of a Friedel and Crafts catalyst such as aluminum chloride. The reactants may be placed under vacuum, say about 2.5 mm. pressure, as soon as they are at the stated temperature, or they may first be converted to the above products and then put under reduced pressure. In either case, dibutyl diphenyl tin and tributyl phenyl tin distill out of the reaction mixture and are then fractionated, the tributyl compound, which boils at about 145° C. at 2.5 mm., being taken overhead and returned to the reactor. The dibutyl compound is removed from the fractionator as product. The mono- and tributyl compounds, as in the case of the mono- and trihalides, are converted upon continued heating to the dibutyl compound, and the latter is continuously and coincidently removed until the mono- and tributyl compounds are used up. Instead of operating the process for the dibutyl product, a separation can be made as in the case of the halide compounds and the mono-, di-, and tributyl products separately recovered. Also, instead of making the foregoing products from tetrabutyl tin and tetraphenyl tin, as described, they may be obtained in other ways and either separated or converted to the dibutyl diphenyl tin product.

While the invention has been described in connection with selected embodiments thereof, it will be appreciated that it is capable of obvious variations without departing from its scope.

In the light of the foregoing description the following is claimed:

1. Process for making diphenyl tin dichloride which comprises: heating to a temperature in the range of about 175 to about 225° C. a mixture comprising phenyl tin trichloride and triphenyl tin chloride to produce diphenyl tin dichloride, reducing the pressure on the reaction mixture, maintaining the temperature in said range to continuously form the dichloride and to coincidently distill said dichloride as formed, said trichloride also distilling with the dichloride, collecting the distillate and heating it to distill off the trichloride from the dichloride, recovering the latter and returning the trichloride to the reaction mixture.

2. Process for making diphenyl tin dichloride which comprises: heating tetraphenyl tin with stannic chloride to a temperature in the range of about 175 to about 225° C. to produce a mixture comprising diphenyl tin dichloride, phenyl tin trichloride, and triphenyl tin chloride, reducing the pressure on said mixture, continuing the heating to maintain the temperature in said range, thereby coincidently distilling the dichloride and the trichloride from the mixture, collecting and heating said dichloride and trichloride to distill the latter from the dichloride, and returning the trichloride to said mixture.

3. Process for making diphenyl tin dihalide which comprises: heating to a temperature in the range of about 175 to about 225° C. a mixture comprising phenyl tin trihalide and triphenyl tin halide to produce diphenyl tin dihalide, reducing the pressure on the reaction mixture, maintaining the temperature in said range to coincidently distill the dihalide and the trihalide, collecting the distillate and heating it to distill off the trihalide from the dihalide, recovering the latter and returning the trihalide to the reaction mixture.

4. Process for making diphenyl tin dihalide which comprises: heating tetraphenyl tin with tin tetrahalide to a temperature in the range of about 175 to about 225° C. to produce a mixture comprising diphenyl tin dihalide, phenyl tin trihalide, and triphenyl tin halide, reducing the pressure on said mixture, continuing the heating to maintain the temperature in said range, thereby coincidently distilling the dihalide and the trihalide from the mixture, collecting and heating said dihalide and trihalide to distill the latter from the dihalide, and returning the trihalide to said mixture.

5. Process for making diaryl tin dihalide which comprises: heating a mixture comprising aryl tin trihalide and triaryl tin halide to produce diaryl tin dihalide, reducing the pressure on the reaction mixture, continuing the heating to coincidently distill said dihalide and said trihalide, collecting the distillate and heating it to distill off the trihalide from the dihalide, and returning the trihalide to the reaction mixture.

6. Process for making diaryl tin dihalide which comprises: heating tetraaryl tin with tin tetrahalide to produce a mixture comprising diaryl tin dihalide, aryl tin trihalide, and triaryl tin halide, reducing the pressure on said mixture, continuing the heating to coincidently distill the dihalide and the trihalide from the mixture, collecting and heating said dihalide and trihalide to distill the latter from the dihalide, and returning the trihalide to said mixture.

ERNEST W. JOHNSON.
JAMES M. CHURCH.

REFERENCES CITED

The following references are of record in the file of this patent:

UNITED STATES PATENTS

| Number | Name | Date |
|---|---|---|
| 2,431,038 | Harris | Nov. 18, 1947 |
| 2,444,270 | Rochow | June 29, 1948 |

OTHER REFERENCES

Kozeschkow: "Ber. deutsch. chem. Ges.," vol. 62 (1929), pages 996 to 999.

Kozeschkow: "Ber. deutsch. chem. Ges.," vol. 66 (1933), pages 1661 to 1665.

Krause and von Grosse: "Die Chemie der Metallorganischen Verbindungen" (1937), pages 336, 340, 341.

Calingaert et al.: "Jour. Am. Chem. Soc.," vol. 62 (1940), pages 1107 to 1110.